United States Patent
Fard et al.

(10) Patent No.: US 10,830,457 B2
(45) Date of Patent: Nov. 10, 2020

(54) FUEL-FIRED APPLIANCE WITH THERMOELECTRIC-POWERED SECONDARY ELECTRIC HEATING

(71) Applicant: Rheem Manufacturing Company, Atlanta, GA (US)

(72) Inventors: Hafez R. Fard, Montgomery, AL (US); Raheel A. Chaudhry, Montgomery, AL (US)

(73) Assignee: Rheem Manufacturing Company, Atlanta, GA (US)

( * ) Notice: Subject to any disclaimer, the term of this patent is extended or adjusted under 35 U.S.C. 154(b) by 0 days.

(21) Appl. No.: 15/352,452

(22) Filed: Nov. 15, 2016

(65) Prior Publication Data

US 2018/0135869 A1 May 17, 2018

(51) Int. Cl.
  *F24D 17/00* (2006.01)
  *F24H 1/14* (2006.01)
  *F24D 12/02* (2006.01)

(52) U.S. Cl.
  CPC ......... *F24D 17/0052* (2013.01); *F24D 12/02* (2013.01); *F24H 1/145* (2013.01); *Y02B 10/70* (2013.01); *Y02B 30/14* (2013.01); *Y02B 30/18* (2013.01)

(58) Field of Classification Search
  CPC ....... F24D 17/0052; F24D 12/02; F24H 1/145
  USPC ....................................................... 122/18.4
  See application file for complete search history.

(56) References Cited

U.S. PATENT DOCUMENTS

| | | | |
|---|---|---|---|
| 4,131,413 A | 12/1978 | Ryno | |
| 5,427,086 A * | 6/1995 | Brownell | F24H 9/2085 |
| | | | 126/110 E |
| 2008/0251035 A1 * | 10/2008 | Peart | F23D 14/82 |
| | | | 122/18.3 |
| 2012/0111386 A1 | 5/2012 | Bell et al. | |
| 2012/0145693 A1 | 6/2012 | Deng | |
| 2012/0216522 A1 | 8/2012 | Browne et al. | |
| 2012/0234262 A1 | 9/2012 | Huang et al. | |
| 2013/0104814 A1 | 5/2013 | Reyman | |
| 2013/0114779 A1 | 5/2013 | Lee et al. | |
| 2013/0186445 A1 | 7/2013 | Lorimer et al. | |
| 2013/0197827 A1 | 8/2013 | Besore et al. | |
| 2014/0109575 A1 | 4/2014 | Balkenende | |
| 2014/0216945 A1 | 8/2014 | Farris et al. | |
| 2015/0128614 A1 | 5/2015 | Ghoshal et al. | |
| 2015/0162517 A1 | 6/2015 | Kasichainula | |
| 2015/0243866 A1 | 8/2015 | Iriyama | |
| 2015/0243870 A1 | 8/2015 | Kushch | |
| 2015/0303364 A1 | 10/2015 | Lievre | |
| 2015/0354833 A1 * | 12/2015 | Kreutzman | F24D 19/106 |
| | | | 392/308 |

(Continued)

*Primary Examiner* — Grant Moubry
*Assistant Examiner* — John E Bargero
(74) *Attorney, Agent, or Firm* — Troutman Pepper Hamilton Sanders LLP

(57) ABSTRACT

A fuel-fired appliance with thermoelectric-powered secondary electric heating has a burner providing hot combustion gasses into a first housing. A second housing containing a fluid receives heat from the combustion gasses in the first housing. A thermoelectric device attaches to a surface of the appliance heated by the combustion gasses and generates a voltage. An electric heating element is in thermal communication with the second housing, and the electric heating element is electrically connected to the thermoelectric device.

15 Claims, 3 Drawing Sheets

(56) References Cited

U.S. PATENT DOCUMENTS

2016/0003469 A1    1/2016  Cotton et al.
2016/0003502 A1    1/2016  Zelissen
2016/0298859 A1*  10/2016  Horvath ................ F24C 15/322
2016/0369700 A1*  12/2016  Ribarov ................ B64D 41/00

* cited by examiner

FUEL-FIRED APPLIANCE WITH THERMOELECTRIC-POWERED SECONDARY ELECTRIC HEATING

The present invention generally relates to fuel-fired appliances and more particularly relates to integrating thermoelectric devices with the fuel-fired appliances.

BACKGROUND OF THE INVENTION

Hot water heaters are used to heat and store a quantity of water in a storage tank for subsequent on-demand delivery to plumbing fixtures such as sinks, bathtubs, showers, and appliances in residential and commercial buildings. A typical fuel-fired water heater uses a combustible fuel gas, such as methane (i.e. natural gas), wherein a gas burner disposed in a combustion chamber below the water tank burns the gas with ambient air, thereby heating the water with a combination of heat radiated from the burner and heat conducted from hot gaseous products of combustion (hereinafter, "combustion gasses") traveling through the walls of the combustion chamber and a flue running through the tank. The combustion gasses travel from the combustion chamber, through the flue, and ultimately vent outside of the building or other enclosure in which the tank is disposed.

Tankless water heaters eliminate the need for storing volumes of hot water by heating water on demand. A burner provides hot combustion gasses to a passage through which a water duct extends. The water in the duct within the passage draws heat from the combustion gasses through the walls of the duct. The combustion products are subsequently vented through a flue. Similar to tankless gas-fired water heaters, gas-fired furnaces use gas burners to heat volumes of air for HVAC systems, and ultimately vent the combustion gasses.

Hot water heaters and furnaces of these types can exhaust varying amounts of energy in the form of heat of the combustion gasses that are vented from the appliances. The amount of vented energy varies with the appliance's efficiency. That is, the more efficient the appliance, the less heat it emits via the exhaust gas.

The thermoelectric effect is a known physical phenomenon, wherein a temperature differential across a material induces a voltage and vice versa. Certain materials, known as thermoelectric materials, exhibit the thermoelectric effect in a strong or convenient form. Thus, thermoelectric materials can be used in thermoelectric generators (TEGs) to convert a temperature differential to electrical energy. TEGs are used in a variety of applications for recovering excess heat. For example, automobiles use thermoelectric generators to salvage thermal energy. To produce electrical energy, TEGs are mounted so that that one ("hot") side is subject to a surface that is relatively hotter than the TEG's opposite ("cool") side. For example, the "hot" side mounts against an automobile's exhaust manifold, while the "cool" side is subject to ambient air or a heat sink.

Presently, commercial thermoelectric generators have relatively low efficiency (e.g., about 5%) and are limited by an available surface area on which the TEGs can be disposed, resulting in a relatively a low power, and corresponding low current, produced in typical applications. Further, as the temperature differential changes, which is typical in TEG applications, the generated voltage, and thus power and current, vary. Therefore, in order to use the low and inconsistent power, current, and voltage production, the TEGs often charge a battery, thereby accumulating over time a significant energy source to operate devices with larger power or current requirements than those which the TEGs can satisfy. However, batteries have energy losses associated with both charging and discharging. Thus, when batteries are used in heat recovery applications, a portion of the recovered energy is lost. Alternatively, TEGs power inverters, producing AC current that is often delivered to a power grid for contributing to the overall supply. However, as with batteries, use of inverters results in unavoidable losses, wasting a portion of the recovered energy from the TEGs.

SUMMARY OF THE INVENTION

One or more embodiments of the present invention relate to fuel-fired heating appliances with thermoelectric-powered secondary electric heating. In certain embodiments, thermoelectric devices are integrated with, and supply electric power to, the appliances. In one embodiment, a fuel-fired appliance includes a burner in communication with a fuel source and has a burner surface at which fuel received by the burner combusts to generate combustion gasses, wherein the burner is disposed with respect to a first housing so that an interior of the first housing receives the combustion gasses. The appliance further includes a second housing that contains a fluid, wherein one of the first housing and the second housing is disposed at least partially within the other of the first housing and the second housing. An exhaust flue is in fluid communication with the first housing so that the exhaust flue receives the combustion gasses from the first housing. A first thermoelectric generator attaches at a surface of the exhaust flue, the first housing, or the second housing so that heat contributed to the surface from combustion at the burner creates a temperature gradient across the first thermoelectric generator so that the first thermoelectric generator responsively generates a voltage. An electric heating element having an electrical input and being in thermal communication with an interior of the second housing. An output of the first thermoelectric generator is connected to the electrical input of the electric heating element so that the voltage is applied to the electrical input.

In a further embodiment, a water heater has a tank capable of holding water. A combustion chamber is adjacent to a lower wall of the tank. A burner is disposed within the combustion chamber, in communication with a fuel source, and has a burner surface at which fuel received by the burner combusts to generate combustion gasses. A flue is in fluid communication with the combustion chamber having a portion extending through the tank so that an exterior of the portion extending through the tank is in contact with the water, and a portion extending from the tank. A thermoelectric generator has a first side attached to at least one of a surface of the tank and a surface of the portion of the flue extending from the outer surface of the tank so that heat contributed to the surface from combustion at the burner creates a temperature gradient across the first thermoelectric generator so that the first thermoelectric generator responsively generates a voltage. A heating element is disposed within an interior of the tank. An output of the thermoelectric generator is connected to the electrical input of the electric heating element so that the voltage is applied to the electrical input.

In yet a further embodiment, a fuel-fired furnace has burner in communication with a fuel source, which has a burner surface at which fuel received by the burner combusts to generate combustion gasses. The fuel-fired furnace further has a flue. A heat exchanger has an inlet in fluid communication with the burner so that it receives combustion gasses from the burner and an outlet that delivers the combustion gasses to the flue. The heat exchanger is disposed within a conduit defining an air passage that directs a supply of flowing air past the heat exchanger, thereby transferring heat from the heat exchanger to the supply of flowing air. A plurality of thermoelectric generators attach to at least one of a surface of the flue and a surface of the conduit so that heat so that heat contributed to the surface from combustion at the burner creates a temperature gradient across the first thermoelectric generator so that the plurality of thermoelectric generators responsively generates a combined voltage. An electric heating element disposed within the air passage. The electric heating element is electrically connected to the plurality of thermoelectric generators so that the electrical heating element receives the voltage from the plurality of thermoelectric generators.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
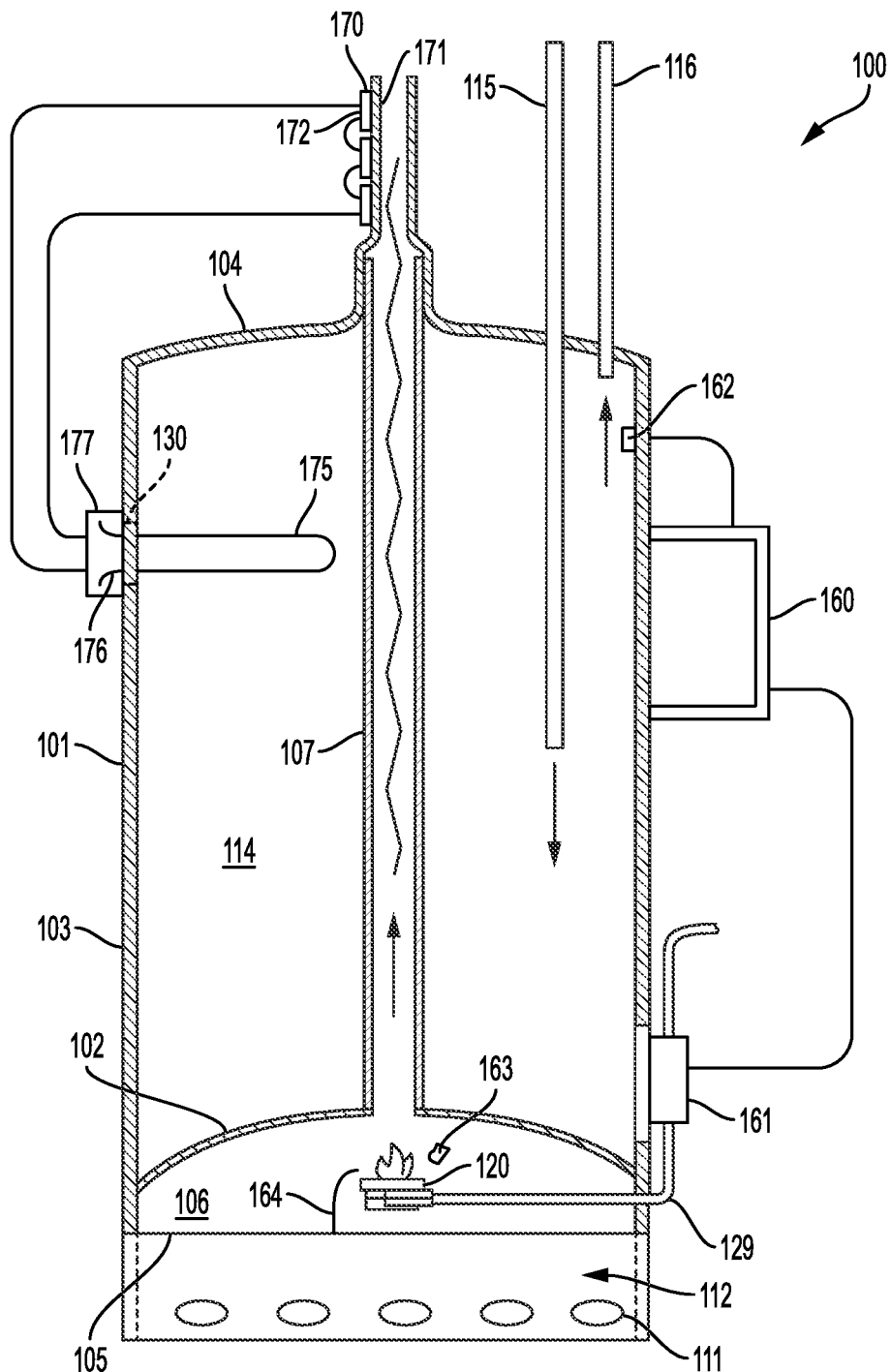
FIG. 1 is a schematic of a water heater with thermoelectric secondary heating.

Repeat use of reference characters in the present specification and drawings is intended to represent same or analogous features or elements of the invention according to the disclosure.

DESCRIPTION OF THE PREFERRED EMBODIMENTS

Reference will now be made in detail to embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

As used herein, terms referring to a direction or a position relative to the orientation of the fuel-fired heating appliance, such as but not limited to "vertical," "horizontal," "upper," "lower," "above," or "below," refer to directions and relative positions with respect to the appliance's orientation in its normal intended operation, as indicated in the Figures herein. Thus, for instance, the terms "vertical" and "upper" refer to the vertical direction and relative upper position in the perspectives of the Figures and should be understood in that context, even with respect to an appliance that may be disposed in a different orientation.

Further, the term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provided illustrative examples for the terms. The meaning of "a," "an," and "the" may include plural references, and the meaning of "in" may include "in" and "on." The phrase "in one embodiment," as used herein does not necessarily refer to the same embodiment, although it may.

FIG. 1 illustrates a water heater 100 with secondary thermoelectric heating. Water heater 100 includes a vertically-oriented body comprising a tank 101 for holding water within an interior volume 114 that is bounded by a lower tank wall 102, a generally cylindrical side wall 103 (i.e. generally annular in cross-sections), and a generally concave (with respect to interior volume 114) top wall 104. A water inlet tube 115 and a water outlet tube 116 are conduits that provide for water entering and exiting tank 101, respectively. In some embodiments, water heater 100 further comprises insulation about or within side wall 103 and top wall 104 to insulate interior volume 114 of tank 101 from heat transfer with the exterior area ambient to water heater 100.

Lower tank wall 102 further attaches to an exhaust flue 107 that runs vertically through the center of tank 101 and exits through top wall 104 to a vent outside of a building or other enclosure in which tank 101 is disposed. Flue 107 provides a surface through which heat transfers from hot combustion gasses within flue 107 to water within volume 114.

Side wall 103 extends below lower tank wall 102 and connects to a horizontal bottom wall 105, so that lower tank wall 102, side wall 103, and bottom wall 105 define a combustion chamber 106. A through-hole in side wall 103 provides access to a burner assembly 120 disposed within combustion chamber 106.

Side wall 103 further extends below bottom wall 105 about the periphery of the tank to a floor 109 (or other surface upon which water heater 100 sits) to provide a skirt wall 110. A volume bounded by skirt wall 110, bottom wall 105, and floor 109 defines an air chamber 112. Skirt wall 110 comprises a plurality of through-holes 111 about the periphery of skirt wall 110 that fluidly communicates volume 112 with the area ambient to water heater 100 so that air may pass into volume 112 from the ambient area. This air within volume 112 may then exit volume 112 through one or more access through-holes in bottom wall 105, or through a duct that extends between volume 112 and combustion chamber 106, to supply combustion chamber 106 with air for combustion. By providing a plurality of holes 111, when water heater 100 is in operation, air chamber 112, and thus combustion chamber 106, has access to air for combustion even if some of the plurality of holes 111 are blocked.

A plurality of thermoelectric generators 170 is mounted against an outer surface of flue 107 above top wall 104 so that a first side 171 of each thermoelectric generator 170 abuts the outer surface of flue 107. A second side 172 of each of the thermoelectric generators 170 is exposed to ambient air. Thus, when burner 120 is in operation and hot combustion gasses flow through flue 107, the outer surface of flue 107 will get hot, while the ambient air temperature will stay substantially below the flue outer surface temperature, thereby causing a temperature gradient and inducing a voltage in the plurality of thermoelectric generators 170. In further embodiments, second sides 172 of thermoelectric generators 170 mount to the interior surface of flue 107. First sides 171 of thermoelectric generators 107 are subject to direct exposure to hot gasses flowing through flue 107, while second sides 172, adjacent to the interior surface of flue 107, which is insulated in part by thermoelectric generators 170 and cooled by air ambient to the exterior surface of flue 107, stays cooler than first sides 171, thereby causing a temperature gradient that induces a voltage in the thermoelectric generators 170.

Each thermoelectric generator 170 has a positive pole connecting to a positive terminal and a negative pole connecting to a negative terminal so that when thermoelectric generator 170 is subject to a temperature differential, the positive pole corresponds to a positive potential induced within thermoelectric generator 170. Thermoelectric generators 170 are electrically connected in series (e.g., a positive terminal of a first thermoelectric generator connects to a negative terminal of a second thermoelectric generator), causing a summing of voltages generated. Thermoelectric generators 170 are further electrically connected to a resistive heating element 175 (e.g. a first wire connects a positive terminal of a first thermoelectric generator in a series of thermoelectric generators 170 to a first electrical fitting of resistive heating element 175, and a second wire connects a negative terminal of a last thermoelectric generator in the series to a second electrical fitting of resistive heating element 175) so that the summed voltages are provided directly to heating element 175. In this way, heating element 175 receives power directly from thermoelectric generators 170 without losses from an intermediary (e.g., a battery or an inverter).

Resistive heating element 175 mounts to side wall 103 and extends radially inward into interior volume 114 of water heater 100. In some embodiments, the resistive heating element is part of a 12V, 96 W heater. In further embodiments, various other heating elements may be used. Resistive heating element 175 extends radially inward into interior tank volume 114 through an aperture 180 that is formed in side wall 103 of the water heater's body 101. A cover 177 covers electrical fittings 176 that attach to resistive heating element 175. A cylindrical bushing (not shown) extends through aperture 180 and is fixed to side wall 103, for example by welding to a metal liner, mounting to a polymer liner, or connection by other suitable means. Electrical fitting 176 of resistive heating element 175 defines external threads that cooperate with internal threads on the cylindrical bushing, so that resistive heating element 175 can be threadedly secured to side wall 103 via the bushing and so that resistive heating element can be maintained in position within water tank volume 114. In further embodiments, resistive heating element 175 may be mounted in various other configurations via various attachment methods.

In operation of water heater 100, a controller 160 disposed at the housing of water heater 100 receives temperature data from one or more thermistors 162 disposed within tank 101, e.g., on water outlet pipe 116 so that the thermistor is in communication with the water in tank 101 and thermistors 162's output signal corresponds to the temperature of water exiting tank 101. When the water temperature falls below a predetermined low-temperature threshold, or set point, controller 160 sends a signal to a relay (not shown) that in turn controls a gas valve 161 in gas line 129 that controls flow of gas in the line. In this instance, controller 160 opens gas valve 161 to thereby allow the pressurized gas to flow via a nozzle (not shown) into the inner volume of burner 120. An igniter 163 is disposed within combustion chamber 106 near burner 120's surface and thereby provides an ignition source for the air/gas mixture at or above burner 120's surface. After a predetermined time of maintaining gas valve 161 in an open state to thereby allow the air/gas flow mixture to flow into the inner volume of burner 120 and upward through burner 120's surface, controller 160 sends a signal to a relay that controls the application of electric current to igniter 163 to cause the igniter to generate a spark just beyond burner 120's surface. As the air/fuel mixture accumulates at burner 120's surface, this ignites the air/fuel mixture. A flame sensor 164, disposed within combustion chamber 160 proximate the exterior of burner 120's surface, detects the existence of the flame and sends a corresponding signal to controller 160.

Controller 160 continues to monitor signals from the temperature and flame sensors and maintains gas valve 161 in an open position (i.e., so that gas continues to flow into burner 120) as long as the temperature sensor indicates that the ambient water temperature is below a second, high-temperature threshold (or set point) that is higher than the low-temperature set point that triggered opening of gas valve 161 and as long as controller 160 continues to receive a signal from flame sensor 164 indicating that the flame exists. If either of these conditions becomes untrue (i.e. if the water temperature reaches the high-temperature set point or if the flame extinguishes), controller 160 sends a signal to the relay to close gas valve 161, thereby ceasing the flow of gas into burner 120. Once controller 160 ceases the gas flow, it again monitors the temperature signal from thermistor 162 and compares the water temperature to the low set point, opening gas valve 161 and igniting the burner when the water temperature again falls below the low set point. The cycle repeats to maintain the water temperature between the high- and low-temperature thresholds.

When burner 120 is in operation, combustion gasses rising through the flue heat the inner surface of flue 107 and conduct through the walls of flue 107 to the outer surface of flue 107. The portions of the outer surface of flue 107 abutting the plurality of thermoelectric generators 170 cause first sides 171 to be hotter than the second sides 172, thereby creating a temperature differential, which causes thermoelectric generators 170 to generate a voltage.

The induced voltage in thermoelectric generators 170 powers resistive heating element 175. In the embodiments described herein, resistive heating element 170 heat the water only when the water is below the high-temperature set point, in order to maintain a desired water temperature range. Because burner 120 is in operation only at times when thermistor 162 is reading a temperature below the upper threshold, the hot gasses heating the interior surface of flue 107 and causing thermoelectric generator 170 to power resistive heating element 175 are produced only for the same period; once burner 120 extinguishes, the supply of hot combustion gasses dissipates, causing first side 171 of thermoelectric generator 170 to cool and in turn terminating the power supply to resistive heating element 175. In this way, control of burner 120 controls the heat from heating element 175. Thus, no intermediates (e.g., batteries or inverters) are necessary; energy recovered as induced electricity is provided directly to resistive heating element 175 and then to the water.

Such a situation can occur where the flue remains hot once the burner disengages. Even after gas valve 161 closes, thereby extinguishing burner 120, hot gasses will remain in combustion chamber 106 and flue 107 for some short amount of time. Therefore, the thermoelectric devices may provide electricity to electric heating element 175 for a period of time after burner 120 extinguishes. Accordingly, in order to allow this heating after burner extinguishment to heat the water to the upper threshold, in further configurations, to prevent overheating the water in tank 101, controller 160 may cause burner 120 to extinguish at a predetermined point before the upper threshold is reached so that delayed heat provided by resistive heating element 175 once burner 120 extinguishes accounts for the final amount of heat necessary to heat water to the upper threshold. In a further embodiment, a bimetallic thermostat is wired in series with the heating element 175 and further measures the water temperature. When the water reaches a predetermined temperature (e.g., 140° F.), the thermostat breaks the circuit, thereby disengaging heating element 175 and preventing the water from overheating. In yet a further embodiment, because the amount of time is relatively short (as the hot gasses will diffuse out the flue 107 and ambient air will fill combustion chamber 106 and flue 107), combined with the relatively low amount of power produced by the thermoelectric devices, the lag time between burner 120's extinguishment and cooling of resistive heating element 175 will not cause a substantial temperature change to the water in tank 101. Thus, the controller will extinguish burner 120 when the water temperature reaches the upper threshold and allow the thermoelectric devices to power the heating element for the additional period of time.

As noted, the illustrated system provides electric current from thermoelectric generators 170 to heating element 175 without the use of electric storage intermediate devices. Further, water heater 100 may make use of electric power generated by thermoelectric generators 170 over the broad range of voltages/currents that the thermoelectric generators may produce. In addition to not requiring intermediates, the water heater 100 uses a broad range of voltages induced in thermoelectric generators 170. Any substantial non-zero voltage applied to the heating element causes resistive heating element 175 to heat the water; resistive heating element 175 has no minimum voltage, current, or power requirements. Further, by wiring the thermoelectric generators in series, a maximum voltage is generated. As power is proportional to the square of the voltage, linearly increasing the voltage quadratically increases the power provided to the water heaters.

Figure 2:
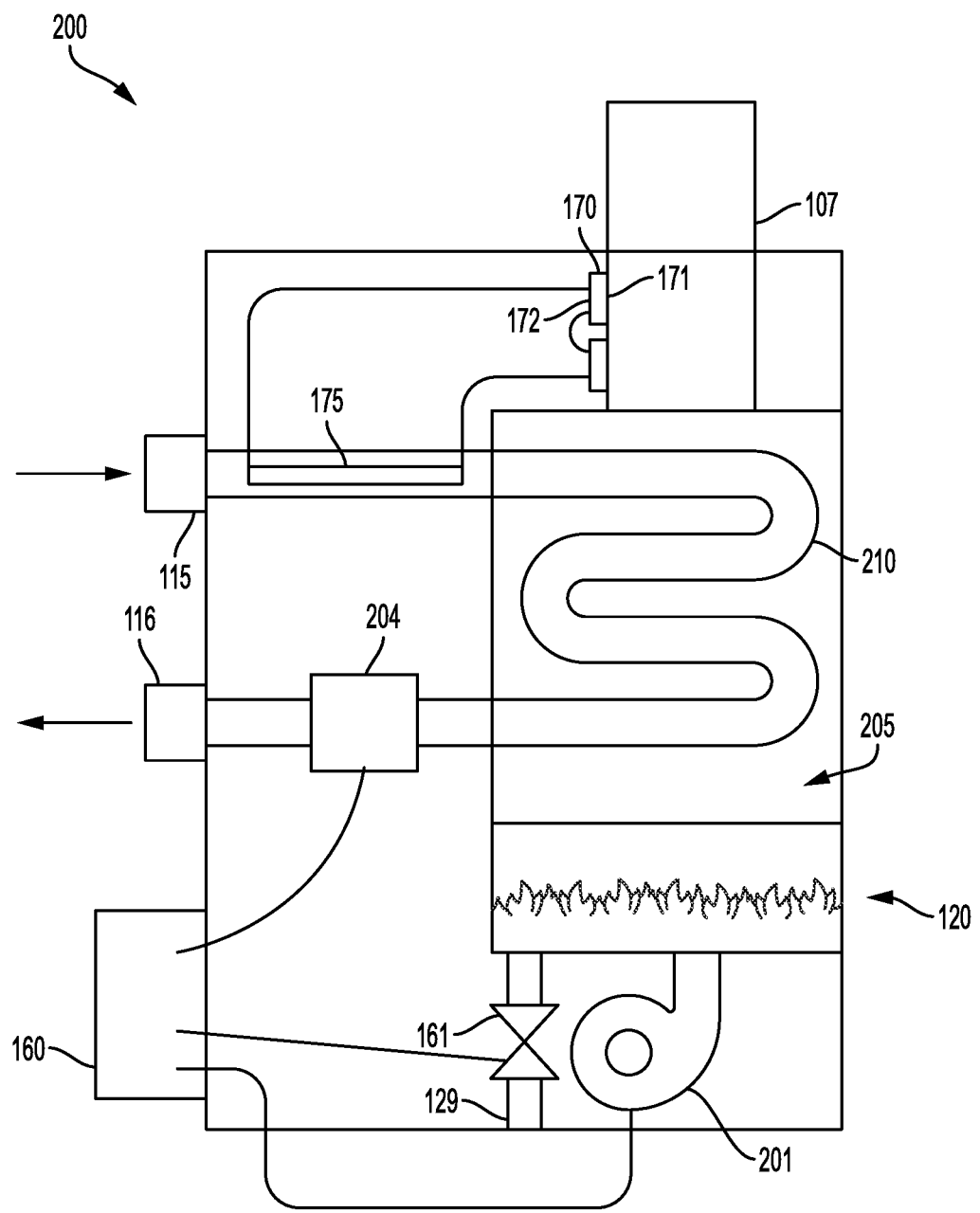
FIG. 2 is a schematic of a tankless water heater with thermoelectric secondary heating.

In a further embodiment, illustrated in FIG. 2, a tankless water heater 200 uses thermoelectric-powered secondary electric heating. Tankless water heater 200 has a burner 120 receiving a fuel gas from gas line 129. A fan 201 supplies air for combustion to burner 120. Hot combustion gasses rise through a heat exchanger flow passage 205 and out a flue 107, propelled both by the low density of the hot combustion gasses, causing an upward draft, and by fan 201 further supplying an upward air flow. Heat exchanger flow passage 205 is defined as a volume within sheet metal walls and having rectangular cross sections. A duct 210 provides a conduit through which water travels, first receiving a supply of water from inlet 115. Duct 210 acts as a heat exchanger as it passes through heat exchanger flow passage 205, wherein an outer surface of duct 210 is in direct contact with combustion gasses housed within heat exchanger flow passage 205, so that water flowing within duct 210 receives heat from the hot combustion gasses through the walls of duct 210. Duct 210 then terminates at outlet 116, where a coupling provides a union with a hot water plumbing supply pipe.

Similar to the embodiment of FIG. 1, thermoelectric generators 170 attach to the exterior of flue 107 so that the first side 171 abuts an exterior surface of flue 107. The second side 172 is exposed to ambient air. Thermoelectric generators 170 electrically couple in series. Thermoelectric generators 170 further electrically couple directly with a resistive heating element 175, thereby providing the sum of the voltages generated directly to resistive heating element 175. Similarly, no electrical intermediaries such as batteries or inverters are necessary between heating element 175 and thermoelectric generators 170.

Resistive heating element 175 is disposed within duct 210 (although in further embodiments, resistive heating element 175 is adjacent to duct 210) before heat exchanger flow passage 205 so that the water passes, and is heated by, resistive heating element 175 before entering heat exchanger flow passage 205. Disposing resistive heating element 175 before heat exchanger flow passage 205 ensures that the water contacts heating element 175 at its lowest temperature (water in and past heat exchanger flow passage 205 is heated by burner 120 to a greater temperature than the water entering heat exchanger flow passage 205), serving two purposes. First, this configuration maximizes the temperature differential between heating element 175 and the adjacent water. This increases the efficiency of the heating performed by heating element 175, as the heat transfer rate between resistive heating element 175 and the water is a function of the temperature difference between the two (the greater the temperature difference, the greater the heat transfer rate, and thus, the greater the efficiency). Second, this configuration enables use of lower voltages generated by thermoelectric generators 170. The voltage generated by thermoelectric generators 170 varies as flue 107 heats and cools. Lower generated voltages result in lower temperatures of resistive heating element 175. Therefore, in order to draw heat from resistive heating element 175 at a low temperature, the water should be at or below the temperature of heating element 175. It should be understood that in further embodiments, heating element 175 may be disposed anywhere along duct 210's path, including a portion within the heat exchanger flow passage or a portion between the heat exchanger and the outlet.

Controller 160 maintains the temperature of water flowing through outlet tube 116. When a hot water tap is opened (e.g., a sink's hot water handle is turned in the "on" direction), water begins to flow through water heater 200. A flow sensor 204 disposed within duct 210 detects the flow rate and sends a signal indicating the flow rate to controller 160. Controller 160, in response, opens gas valve 161, thereby allowing the pressurized gas to flow via a nozzle (not shown) into the inner volume of burner 120. An igniter 163 (FIG. 1) disposed within combustion chamber 106 near burner 120's surface provides an ignition source for the air/gas mixture passing upward through burner 120's surface. After a predetermined time of maintaining gas valve 161 in an open state and thereby allowing the air/gas flow mixture to accumulate at burner 120, controller 160 sends a signal to a relay that controls the application of electric current to igniter 163, causing the igniter to generate a spark just beyond the surface of burner 120's surface, thereby igniting the air/fuel mixture. A flame sensor 164 (FIG. 1)

disposed within combustion chamber 160 proximate the exterior of burner 120's surface detects the existence of the flame and sends a corresponding signal to controller 160. Thermistor 163 (FIG. 1), disposed near the outlet of tankless heater 200, sends a signal to the controller indicating the temperature of the outgoing water. Based on this temperature reading, controller 160 increases or decreases the flow of gas into burner 120 to increase or decrease the water temperature at the outlet, respectively. In further embodiments, controller 160 uses flow rate information, provided by flow sensor 204, to determine the flow of gas into burner 120; the higher the flow rate, the more controller 160 opens gas valve 161, thereby causing a faster water heating rate.

Controller 160 continues to monitor signals from the temperature and flame sensors and maintains gas valve 161 in an open position (i.e., so that gas continues to flow into burner 120) as long as the flow sensor indicates that the water is flowing and as long as controller 160 continues to receive a signal from flame sensor 164 indicating that the flame exists. If either of these conditions becomes untrue (i.e. if the water stops flowing or if the flame extinguishes), controller 160 sends a signal to the relay to close gas valve 161, thereby ceasing the flow of gas into burner 120. Once controller 160 ceases the gas flow, it again monitors the flow sensor signal, opening gas valve 161 and igniting the burner when the water begins flowing again. The cycle repeats to maintain the water temperature for the demanded water.

Figure 3:
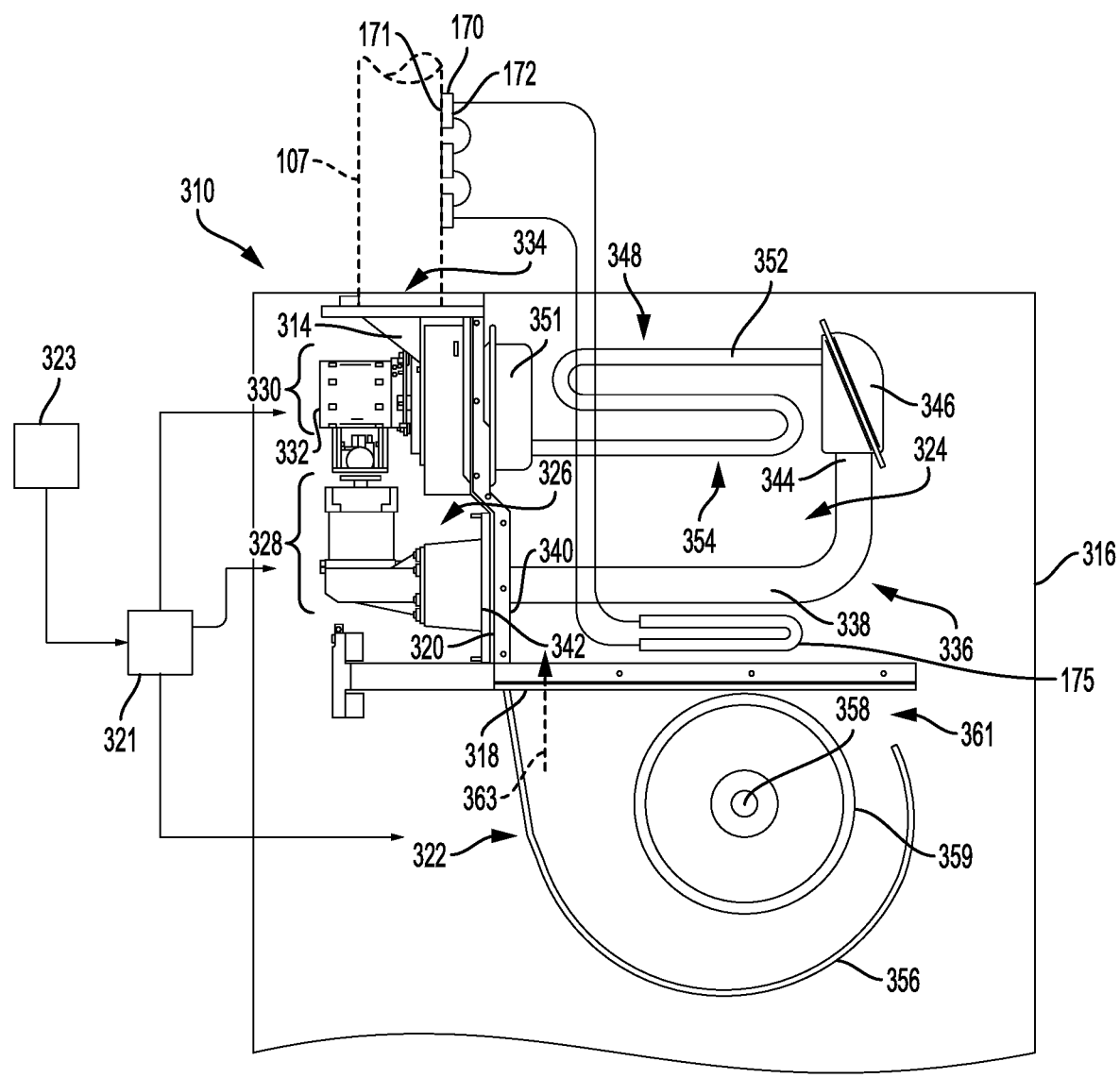
FIG. 3 is a schematic of a furnace with thermoelectric secondary heating.

FIG. 3 illustrates a representative fuel-fired furnace 310 with thermoelectric secondary heating in accordance with one or more embodiments of the present invention. Furnace 310 is a forced air appliance to be used in a heating, ventilation, and air conditioning (HVAC) system of a building. In a forced air system, an air handler connects to a ductwork ventilation system that distributes air as part of the HVAC system and returns it to the air handler. An air handler blower draws air from a temperature conditioned space within the building through the ductwork ventilation system. The ductwork is in fluid communication with an input flange (not shown) of a housing 316 of furnace 310 that surrounds an opening through housing 316. A lower portion of housing 316 encloses a plenum 322 in which an air handler blower 356 is disposed. The blower has an input thereto that is fluidly connected to the opening in housing 316 that connects to the ductwork so that the blower draws air from the conditioned space via the ductwork and the opening into the blower and having an output fluidly connected to an opening through an interior partition 318 separating plenum 322 from a flow passage 324 in the interior of furnace housing 316 so that air handler blower 356 pushes the received air into flow passage 324 so that the air passes over a heat exchanger 336 and moves through a through-outlet (not shown) of housing 316 and into outlet ductwork attached to the output side of housing 16 that directs the now-warmed air back into the conditioned space. A thermostat 323 mounted within the conditioned space has a temperature sensor that senses temperature in the conditioned space. A processor or temperature responsive mechanical device in the thermostat compares the temperature to a set point temperature set by a user through an interface at the thermostat and, depending on that comparison, may send a signal to a controller 321 requesting that the controller actuate the furnace or, more specifically, actuate the burner (discussed below) to provide warm combustion exhaust to the heat exchanger and actuate air handler blower 56 to move air over the heat exchanger.

The burner couples with a gas source selectively provided or blocked by a gas valve. When the burner is actuated, the gas valve opens to provide pressurized gas into the burner through a venturi passage. An induction blower, discussed below, draws air from an air source, external to the furnace, into the burner through the venturi passage, where the gas and air begin to mix, before passing into the burner and through a burner screen. An igniter is disposed at the burner screen. At a predetermined time after the gas valve opens or simultaneously therewith, the igniter provides an electric spark that ignites the air/gas mixture traveling through the burner screen. A flame sensor then sends a signal to the controller to cease operation of the igniter. In this way, the burner operates to provide hot combustion gasses to the heat exchanger. In a further embodiment, the induction draft blower may be omitted, and the gas flow (and air drawn into the venturi therewith) is conveyed to the burner surface via the pressurization of the gas line. When the burner ignites, hot gasses exiting the burner have a lower density than air ambient to the furnace and therefore rise out of the flue. Thus, the exiting combustion gasses draw air by induction into the combustion chamber. Similarly, water heaters of FIGS. 1 and 2 may implement induction blowers to draw air for combustion into the burner, while further embodiments utilize rising combustions gasses to induce flow of air into the burner.

Outer housing 316 connects to respective horizontal and vertical partition members 318, 320 (which may be considered part of the housing) that divide the interior of housing 16 into return air plenum 322, supply air flow passage 324, and an equipment chamber 326. Each partition may be a generally sheet-like structure. Horizontal partition member 318 divides the interior of housing 316 into return air plenum 322 and supply air flow passage 324 so that the only fluid communication between the two areas is the through-hole for the output of blower 356. As discussed above, air handler blower 356 pulls air from the ducting from the conditioned space into plenum 322 and pushes the received air into supply air flow passage 324 through that hole. Equipment chamber 326 is also positioned above horizontal partition 318 but to the left of vertical partition 320 and flow passage 324. Similar to partition 318, partition 320 completely separates its opposing chamber except for one or more through-holes as described herein. Housing 316 encloses furnace 310 except for air entrances, a flue exit, and service doors.

Equipment chamber 326 encloses a burner assembly 328. Above burner assembly 328, and also to the left of vertical partition member 320, is an induction draft blower 330. Blower 330 has a motor 332, a flue adaptor 314, which may include an ambient air inlet as described below, and an upwardly facing outlet 334 connectable to external exhaust flue 107.

Operatively disposed within supply air flow passage 324 is a combustion heat exchanger 336 having a primary heat exchanger portion defined by two L-shaped metal combustion output tubes 338 (one of which is visible in FIG. 3). Each of the L-shaped metal tubes 38 has two ends. An open first end 340 is connected to an end of a burner outlet 342 so that the end of tube 338 is in fluid communication with burner outlet 342 to receive combustion gases therefrom, and an open second upward turned end is connected to and in fluid communication with an inlet manifold 346 to deliver the combustion gases thereto.

Heat exchanger 336 also includes a secondary heat exchanger section 348 that is disposed within an upper portion of air flow passage 324 and that includes inlet manifold 346 connected to upward turned end 344 of L-shaped metal combustion output tubes 338, and an outlet manifold 351 connected to and in fluid communication with an inlet of induction draft blower 330. The interiors of inlet and outlet manifolds 346, 351 are communicated to each other by a plurality of vertically serpentine, or coiled, metal secondary heat exchanger tubes 352 that are horizontally spaced apart from each other in a front-to-rear direction (i.e. into and out of the page view of FIG. 3) and connected at their opposite ends to and in fluid communication with inlet and outlet manifolds 346, 351. Only one of tubes 352 is visible in FIG. 3, the remaining tubes 352 being positioned behind single visible tube 352. As illustrated, each tube 352 has a diameter smaller than the diameter of each tube 338.

The configuration of air handler blower 356 may vary as desired, but, in the illustrated embodiment, the blower is a squirrel-cage blower with a finned ring 359 driven by an induction electric motor 358 so that air enters blower 356 through an inlet 361 from plenum 322 and exits the blower through an outlet and an opening in generally plate-like horizontal member 318, as indicated at 363. Air 354 forced upwardly by blower 356 through supply air passage 324 moves over tubes 338 and 352 and is then discharged through a housing outlet opening (not shown) for delivery by supply ductwork (not shown) to the conditioned space served by furnace 10.

At the same time, operation of a gas burner in burner assembly 328 creates flames that are drawn into open left end 340 of primary combustion outlet tubes 338 by the operation of induction draft blower 330, which creates a negative pressure within heat exchanger tubes 352, manifolds 346 and 351, and tubes 338. This negative pressure is therefore also present at the burner's surface, causing hot flue gas to flow through heat exchanger tubes 338 and 352 from the burner to blower 330. The flames generate hot combustion gases that blower 330 draws sequentially through tubes 338, inlet manifold 346, tubes 352, and outlet manifold 351, and then discharges to atmosphere via exhaust flue pipe 107. As air 354 externally traverses heat exchanger 36, combustion heat transfers from the combustion gases in the tube interior volumes to the traversing air through the tube walls. That is, heat transfer occurs across walls of the tubes.

A plurality of thermoelectric generators 170 is mounted in against flue 107 above housing 316 so that a first side 171 of each thermoelectric generator 170 abuts the outer surface of flue 107. A second side 172 of each of the thermoelectric generators 170 is exposed to ambient air. Thus, when burner 120 is in operation and hot combustion gasses flow through flue 107, the surface of flue 107 will get hot, while the ambient air temperature will stay substantially below the flue surface temperature, thereby causing a temperature gradient and inducing a voltage in the plurality of thermoelectric generators 170. Thermoelectric generators 170 are electrically connected in series, causing a summing of voltages generated. Thermoelectric generators 170 are further electrically connected to a resistive heating element 175, thereby providing the summed voltages directly to heating element 175.

Resistive heating element 175 mounts to vertical member 320 via a bracket (not shown) and extends inward into flow passage 324, thereby heating air 354 as it passes over resistive heating element 175 when resistive heating element, powered by thermoelectric generators 170, is heated to a temperature above air 354. In the illustrated embodiment, resistive heating element 175 is disposed in flow passage 324 so that air reaches resistive heating element 175 before it passes heat exchanger 336. In this way, air 354 passes resistive heating element 175 when air 354 is at a lower temperature than if resistive heating element were disposed after heat exchanger 336, thereby increasing the heat transfer rate between resistive heating element 175 and air 354. In further embodiments, heating element 175 may be disposed after heat exchanger 336 or in the airflow path in parallel with heat exchanger 336 so that a portion of heat exchanger is disposed in the airflow before heating element 175 and a portion of the heat exchanger is disposed in the airflow after heating element 175.

While one or more preferred embodiments of the invention are described above, it should be appreciated by those skilled in the art that various modifications and variations can be made in the present invention without departing from the scope and spirit thereof. For example, elements of one embodiment may be combined with another embodiment to create a still further embodiment. It is intended that the present invention cover such modifications and variations as come within the scope and spirit of the present disclosure, the appended claims, and there equivalents. For example, the thermoelectric devices may attach to any surface having a side that is generally hotter than the surroundings. (E.g., thermoelectric devices may attach to the top of the water heater or the surfaces of the heat exchanger passage in the furnace or tankless water heater.)

What is claimed is:

1. A fuel-fired appliance comprising:
   a burner in communication with a fuel source and having a burner surface at which fuel received by the burner combusts to generate combustion gasses, wherein the burner is disposed with respect to a first housing so that an interior of the first housing receives the combustion gasses;
   a second housing that contains water, wherein one of the first housing and the second housing is disposed at least partially within the other of the first housing and the second housing;
   a flue disposed on an opposite side of the second housing from the burner and in fluid communication with the first housing so that the flue receives the combustion gasses from the first housing;
   a first thermoelectric generator attached at a surface of the flue so that heat contributed to the surface of the flue from combustion at the burner and from heat lost by the water when the burner is disengaged creates a temperature gradient across the first thermoelectric generator so that the first thermoelectric generator responsively generates a voltage;
   an electric heating element having an electrical input and being in thermal communication with an interior of the second housing; and
   a controller in communication with the burner and configured to disengage the burner at a predetermined water temperature, the predetermined water temperature being lower than a set water temperature,
   wherein an output of the first thermoelectric generator is directly connected to the electrical input of the electric heating element so that a voltage is applied to the electrical input, the voltage powering the electric heating element to heat the water in the second housing to the set water temperature.

2. The appliance of claim 1, further comprising a second thermoelectric generator attached to the flue and configured to generate a second voltage, wherein the first thermoelectric generator electrically connects to the second thermoelectric generator in series such that a sum of the voltage and the second voltage is applied to the electric heating element.

3. The appliance of claim 1, wherein the electric heating element is disposed within a first portion of the second housing.

4. The appliance of claim 1, wherein the electric heating element is disposed in the second housing.

5. The appliance of claim 1, wherein the first thermoelectric generator attaches to an exterior surface of the flue.

6. The appliance of claim 1, wherein the first thermoelectric generator attaches to an interior surface of the flue.

7. The appliance of claim 1, wherein at least a portion of an exterior surface of the second housing comprises at least a portion of an interior surface of the first housing.

8. The appliance of claim 7, wherein the exterior surface of the second housing receives heat from the combustion gasses within the first housing through a wall of the first housing.

9. The appliance of claim 1, wherein the second housing comprises a duct that extends through a volume defined by the first housing.

10. A water heater comprising:
    a tank capable of holding water;
    a combustion chamber adjacent to a lower wall of the tank;
    a burner disposed within the combustion chamber, in communication with a fuel source, and having a burner surface at which fuel received by the burner combusts to generate combustion gasses;
    a flue in fluid communication with the combustion chamber having a portion extending through the tank so that an exterior of the portion extending through the tank is in contact with the water, and an upper portion extending from the tank that is not in contact with the water or the combustion chamber;
    a first thermoelectric generator having a first side attached to a surface of the upper portion of the flue so that heat contributed to the surface from combustion at the burner and from heat lost by the water when the burner is disengaged creates a temperature gradient across the first thermoelectric generator so that the first thermoelectric generator responsively generates a voltage; and
    an electric heating element disposed within an interior of the tank;
    a controller in communication with the burner and configured to disengage the burner at a predetermined water temperature, the predetermined water temperature being lower than a set water temperature,
    wherein an output of the first thermoelectric generator is connected directly to an electrical input of the electric heating element so that a voltage is applied to the electrical input, the voltage powering the electric heating element to heat the water within the interior of the tank to the set water temperature.

11. The water heater of claim 10, further comprising a second thermoelectric generator configured to generate a second voltage, wherein the first thermoelectric generator electrically connects to the second thermoelectric generator in series such that a sum of the voltage and the second voltage is applied to the electric heating element.

12. The water heater of claim 10, wherein the first thermoelectric generator attaches to an exterior surface of the upper portion of the flue.

13. The water heater of claim 10, wherein the first thermoelectric generator attaches to an interior surface of the upper portion of the flue.

14. The fuel-fired appliance of claim 1, wherein the first thermoelectric generator is not connected to the controller.

15. The water heater of claim 10, wherein the first thermoelectric generator is not connected to the controller.

* * * * *